United States Patent
Jain et al.

(10) Patent No.: US 8,682,725 B2
(45) Date of Patent: Mar. 25, 2014

(54) REGIONAL LOCATION-BASED ADVERTISING

(75) Inventors: Ravi Jain, Palo Alto, CA (US); Yelena Nakhimovsky, San Francisco, CA (US)

(73) Assignee: Google Inc., Mountain View, CA (US)

(*) Notice: Subject to any disclaimer, the term of this patent is extended or adjusted under 35 U.S.C. 154(b) by 685 days.

(21) Appl. No.: 12/881,689

(22) Filed: Sep. 14, 2010

(65) Prior Publication Data

US 2012/0066066 A1    Mar. 15, 2012

(51) Int. Cl.
*G06Q 30/00* (2012.01)
*G06Q 30/02* (2012.01)

(52) U.S. Cl.
CPC ........ *G06Q 30/0261* (2013.01); *G06Q 30/0269* (2013.01); *G06Q 30/0251* (2013.01); *G06Q 30/0241* (2013.01)
USPC ................. 705/14.58; 705/14.66; 705/14.49; 705/14.4

(58) Field of Classification Search
USPC ..................................................... 705/14.58
See application file for complete search history.

(56) References Cited

U.S. PATENT DOCUMENTS

| 6,298,125 | B1  | 10/2001 | Goldberg et al. |        |
|-----------|-----|---------|-----------------|--------|
| 6,414,635 | B1  | 7/2002  | Stewart et al.  |        |
| 7,089,264 | B1* | 8/2006  | Guido et al.    | 1/1    |
| 2006/0143050 | A1 | 6/2006 | Garg et al.    |        |
| 2009/0198607 | A1* | 8/2009 | Badger et al. | 705/37 |
| 2009/0199233 | A1* | 8/2009 | Selinger et al. | 725/34 |

FOREIGN PATENT DOCUMENTS

| KR | 2000058743 A | 10/2000 |
| KR | 2005095402 A | 9/2005  |
| KR | 2006103832 A | 10/2006 |
| KR | 2009001831 A | 1/2009  |

OTHER PUBLICATIONS

Miller, "Different Regions = Different Ads", Capitol Fax, Aug. 28, 2006, on line at capitolfax.com/2006/08/28/different-regions-different-ads.*
Authorized Officer Agnes Wittmann-Regis, International Preliminary Report on Patentability in International Application No. PCT/US2011/051332, dated Mar. 28, 2013, 7 pages.
Authorized Officer Kim Eun Soo, International Search Report and Written Opinion in International Application No. PCT/US2011/051332, dated Apr. 13, 2012, 10 pages.
Australian Government, IP Australia, Patent Examination Report No. 1 for Application No. 2011302256, dated Aug. 12, 2013, 3 pages.

* cited by examiner

*Primary Examiner* — John G Weiss
*Assistant Examiner* — Scott C Anderson
(74) *Attorney, Agent, or Firm* — Fish & Richardson P.C.

(57) ABSTRACT

In general, one aspect of the subject matter described in this specification can be embodied in methods that include the actions of identifying a target region and an exclusion region of the target region, where the target region encompasses the exclusion region. A target user is identified within the target region and not within the exclusion region encompassed by the target region. A target advertisement is selected for the target user based on the target user being within the target region and not within the exclusion region encompassed by the target region. The target advertisement is sent to the target user. An exclusion user is identified within the exclusion region encompassed by the target region. An exclusion advertisement different from the target advertisement is selected for the exclusion user based on the exclusion user being with the exclusion region. The exclusion advertisement is sent to the exclusion user.

30 Claims, 6 Drawing Sheets

REGIONAL LOCATION-BASED ADVERTISING

BACKGROUND

The present disclosure relates to content presentation, including advertising.

Advertisers provide advertisements in different forms in order to attract consumers. An advertisement ("ad") is a piece of information designed to be used in whole or in part by a user, for example, a particular consumer. Ads can be provided in electronic form. For example, online ads can be provided as banner ads on a web page, as ads presented with search results, or as ads presented in a mobile application.

One can refer to the inclusion of an ad in a medium, e.g., a web page or a mobile application, as an impression. An advertising system can include an ad in a web page, for example, in response to one or more keywords in a user search query input to a search engine. If a user selects the presented ad (e.g., by "clicking" the advertisement), the user is generally taken to another location associated with the ad, for example, to another, particular web page.

A particular user action associated with an ad can be referred to as a conversion. A conversion can be online or offline. An example of an offline conversion is when a user views an ad online for a particular product and then purchases the item at an offline retail store.

Advertising can be location-based. For example, an advertiser can specify that a certain online ad should only displayed to users in a certain geographical region. An advertising system can identify users who are likely within the specified geographical region and serve the ad to those users.

SUMMARY

In general, this specification relates to content presentation.

In general, one aspect of the subject matter described in this specification can be embodied in methods that include the actions of identifying a target region and an exclusion region of the target region, where the target region encompasses the exclusion region; identifying a target user within the target region and not within the exclusion region encompassed by the target region; selecting a target advertisement for the target user based on the target user being within the target region and not within the exclusion region encompassed by the target region; sending the target advertisement to the target user; identifying an exclusion user within the exclusion region encompassed by the target region; selecting an exclusion advertisement different from the target advertisement for the exclusion user based on the exclusion user being with the exclusion region; and sending the exclusion advertisement to the exclusion user. Other embodiments of this aspect include corresponding systems, apparatus, and computer program products.

These and other embodiments can optionally include one or more of the following features. Identifying the exclusion region includes receiving an identifier of a physical store from an advertiser and determining the location of the physical store. Identifying the target region and the exclusion region encompassed by the target region includes receiving target region information and exclusion region information from an advertiser. Target region information or exclusion region information includes one or more of: a geographic name, a zip code, a telephone area code, or a shape corresponding to a region on a map.

The actions further include comparing the target region information with the exclusion region information; and determining whether the target region specified by the target region information encompasses the exclusion region specified by the exclusion region information. The actions further include determining whether a predicted rate of advertisements sent to users in the target region exceeds or is less than a threshold rate.

Identifying the target user or the exclusion user includes receiving one or more of: global positioning system (GPS) coordinates from a mobile device, location coordinates from a router for a wireless local area network (LAN), an internet protocol (IP) address, or one or more search queries. The actions further include identifying an additional exclusion region encompassed by the target region; identifying an additional exclusion user within the additional exclusion region encompassed by the target region; and sending an additional exclusion advertisement to the additional exclusion user. Identifying the additional exclusion region includes receiving additional exclusion region information from an advertiser, and where the additional exclusion region information includes one or more of: a demographic specification or an online behavior specification. The actions further include providing a suggestion to an advertiser to change the size of the exclusion region of the target region or to introduce additional exclusion regions.

In general, another aspect of the subject matter described in this specification can be embodied in methods that include the actions of receiving a request to serve a content item to a user; determining one or more candidate content items; identifying a location associated with the user; determining whether any of the candidate content items are associated with a target region including the location of the user; determining whether any of the candidate content items are associated with an exclusion region including the location of the user, where the target region encompasses the exclusion region; boosting a score of each candidate content item determined to be associated with the target region and not associated with the exclusion region encompassed by the target region; restricting candidate content items determined to be associated with the exclusion region; selecting a content item of the one or more candidate content items to serve to the user using the scores for the candidate content items; and serving the selected content item to the user. Other embodiments of this aspect include corresponding systems, apparatus, and computer program products.

These and other embodiments can optionally include one or more of the following features. Restricting candidate content items includes removing them as candidates. Restricting candidate content items includes decreasing a score of each candidate content item associated with the exclusion region. Restricting candidate content items includes substituting an alternative candidate content item for one of the one or more candidate content items. The actions further include determining whether any of the candidate content items are associated with one or more additional exclusion regions including the location of the user, where the target region encompasses each additional exclusion region; and restricting candidate content items determined to be associated with one of the one or more additional exclusion regions.

Particular embodiments of the invention can be implemented to realize one or more of the following advantages. Advertisers can target users in a target geographical region while explicitly excluding user's locations within one or more specified portions of the region. The target region and the specified parts of the target region can be specified conveniently, for example, by geographical name or zip code. An advertising system can suggest whether to expand the specified parts of the region, for example, to increase an ad effectiveness (e.g., a click-through rate). An advertiser can focus on regions where a competitor has an advantage (e.g., a higher concentration of local stores) to compete for the competitor's customers. An advertiser can avoid paying for advertisements to customers who have already converted or are likely to convert (e.g., customers who are already in the store).

The details of one or more embodiments of the invention are set forth in the accompanying drawings and the description below. Other features, aspects, and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Advertisers seek to have content items (e.g., advertisements) presented to users likely to be interested in the content items. For example, content items can be targeted to users based on the user's location. In some cases, advertisers seek to target content items to some users in a geographical region, and exclude content items to other users within the geographical region. For instance, an advertiser can seek to target a content item to users in a geographical region (e.g., a mall) but withhold that content item from users in sub-region of the geographical region (e.g., a store within the mall). Content items associated with a region or sub-region can be boosted by a system when determining content items to serve to users.

While reference will be made below to advertising systems and processes, other forms of content including other forms of sponsored content can be managed and presented in accordance with the description below.

Figure 1:
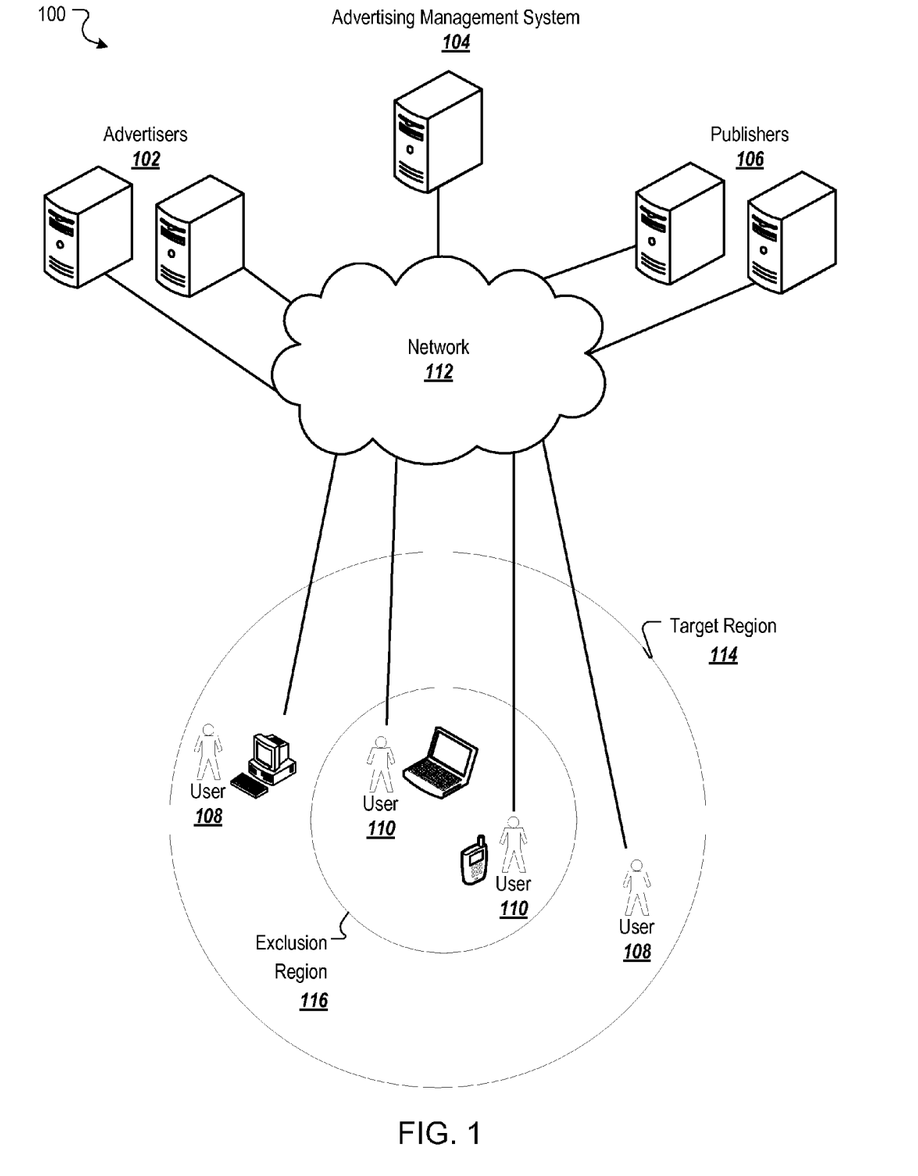
FIG. 1 is a block diagram of an example content presentation system.

FIG. 1 is a block diagram of an example content presentation system 100. In some implementations, one or more advertisers 102 can directly, or indirectly, enter, maintain, and track ad information in an advertising management system 104. Though reference is made to advertising, other forms of content, including other forms of sponsored content, can be delivered by the system 104. The ads can be in the form of graphical ads, such as banner ads, text only ads, image ads, audio ads, video ads, ads combining one or more of any of such components, and so on. The ads can also include embedded information, such as links, meta-information, and/or machine executable instructions.

One or more publishers 106 can submit requests for ads to the system 104. The advertising management system 104 responds by sending ads to the requesting publisher 106 for placement on, or association with, one or more of the publisher's content items (e.g., web properties). Example web properties can include web pages, television and radio advertising slots, or print media space.

Other entities, such as users 108 and 110 and advertisers 102, can provide usage information to the system 104, for example, whether or not a conversion (e.g., a purchase or other interaction) or a click-through related to an ad (e.g., a user has selected an ad) has occurred. This usage information can include measured or observed user behavior related to ads that have been served. In some implementations, the advertising management system 104 performs financial transactions, for example, crediting the publishers 106 and charging the advertisers 102 based on the usage information.

A network 112, such as a local area network (LAN), wide area network (WAN), the Internet, one or more telephony networks or a combination thereof, connects the advertisers 102, the system 104, the publishers 106, and the users 108 and 110.

One example publisher 106 is a general content server that receives requests for content (e.g., articles, discussion threads, music, video, graphics, search results, web page listings, information feeds, and so on), and retrieves the requested content in response to the request. The content server can submit a request for ads to an advertisement server in the advertising management system 104. The ad request can include a number of ads desired. The ad request can also include content request information. The content request information can include the content itself (e.g., page, video broadcast, radio show, or other type of content), a category corresponding to the content or the content request (e.g., arts, business, computers, arts-movies, arts-music, and so on), part or all of the content request, content age, content type (e.g., text, graphics, video, audio, mixed media, and so on), geo-location information, and so on.

In some implementations, the content server (or a client browser or the like) can combine the requested content with one or more of the ads provided by the advertising management system 104. The combined content and ads can be served (e.g., sent/rendered) to the users 108 that requested the content for presentation in a viewer (e.g., a browser or other content display system). The content server can transmit information about the ads back to the advertisement server, including information describing how, when and/or where the ads are to be rendered (e.g., in hypertext markup language (HTML) or JavaScript™).

Another example publisher 106 is a search service. A search service can receive queries for search results. In response, the search service can retrieve relevant search results from an index of documents (e.g., from an index of web pages). Search results can include, for example, lists of web page titles, snippets of text extracted from those web pages, and hypertext links to those web pages, and can be grouped into a predetermined number (e.g., ten) of search results.

The search service can submit a request for ads to the advertising management system 104. The request can include a number of ads desired. This number can depend on the search results, the amount of screen or page space occupied by the search results, the size and shape of the ads, and so on. In some implementations, the number of desired ads will be from one to ten, or from three to five. The request for ads can also include the query (as entered or parsed), information based on the query (such as geo-location information, whether the query came from an affiliate and an identifier of such an affiliate), and/or information associated with, or based on, the search results. The information can include, for example, identifiers related to the search results (e.g., document identifiers of "docIDs"), scores related to the search results (e.g., information retrieval ("IR") scores), snippets of text extracted from identified documents (e.g., web pages), full text of identified documents, feature vectors of identified documents, and so on. In some implementations, IR scores can be computed from, for example, dot products of feature vectors corresponding to a query and a document, page rank scores, and/or combinations of IR scores and page rank scores, and so on.

In some implementations, the advertising management system 104 includes an auction process to select ads from the advertisers 102. For example, the advertisers 102 can be permitted to select, or bid, an amount the advertisers are willing to pay for each presentation of or interaction with (e.g., click) of an ad, e.g., a cost-per-click amount an advertiser pays when, for example, a user clicks on an ad. The cost-per-click can include a maximum cost-per-click, e.g., the maximum amount the advertiser is willing to pay for each click of an ad based on a keyword, e.g., a word or words in a query. Other bid types, however, can also be used. Based on these bids, ads can be selected and ranked for presentation.

The search service can combine the search results with one or more of the ads provided by the system 104. This combined information can then be forwarded to the users 108 and 110 that requested the content. The search results can be maintained as distinct from the ads, so as not to confuse the user between paid ads and presumably neutral search results.

In some implementations, one or more publishers 106 can submit requests for ads to the advertising management system 104. The system 104 responds by sending ads to the requesting publisher 106 for placement on one or more of the publisher's web properties (e.g., websites and other network-distributed content) that are relevant to the web property. For example, if a publisher 106 publishes a sports-related web site, the advertising management system can provide sports-related ads to the publisher 106. In some implementations, the requests can instead be executed by devices associated with the users 108 and 110, e.g., by the execution of a javascript when the publisher's web page is loading on a client device.

Another example publisher 106 is a mobile application developer. A mobile application is an application specifically designed for operation on a mobile device (e.g., a smartphone). The mobile application can also include ads positioned within the content of the mobile application. The ads can be received from the system 104 for placement in the mobile application when accessed by a user (e.g., when a particular page of a mobile application is loaded on the mobile device).

In some implementations, advertisers specify that certain target ads should be preferentially shown in a target geographical region 114. The advertising management system 104 can accommodate these geographical specifications in various ways. For example, the advertising management system 104 can boost a score for the specified ads when it determines that it is selecting an ad for a user 108 in the target region 114. In some implementations, the advertising management system 104 charges a fee or increases a fee for the advertisers 102 who specify geographical regions. For example, the advertising management system 104 can charge a flat fee (e.g., monthly), or the advertising management system 104 can charge a fee each time a particular ad is boosted based on a user's location.

In further implementations, advertisers specify that their targeted ads should not be shown (or not preferred over other ads) in certain exclusion regions 116 encompassed by the target region 114. The advertising management system 104 can accommodate these specifications in various ways. For example, if the advertising management system 104 determines that it is selecting an ad for a user within the exclusion region 116 of a target region 114, the advertising management system 104 can decrease a score for specified ads, or eliminate the specified ads as candidate ads for the user. In some implementations, the advertising management system 104 charges additional fees for specifying exclusion regions.

In some implementations, where an advertiser is charged based on a number of ads clicked on, the advertising management system 104 can charge a revenue premium for allowing location based targeting or regional ad targeting or both. For example, where locally targeted ads can be more appealing to users and hence lead to more clicks, the advertising management system 104 can charge an extra fee for location based advertising. In some implementations, the advertising management system 104 charges a revenue premium because an advertising performance metric (e.g., click-through rate) is greater in the combined target region and exclusion region than it would be using a single region.

Figure 2:
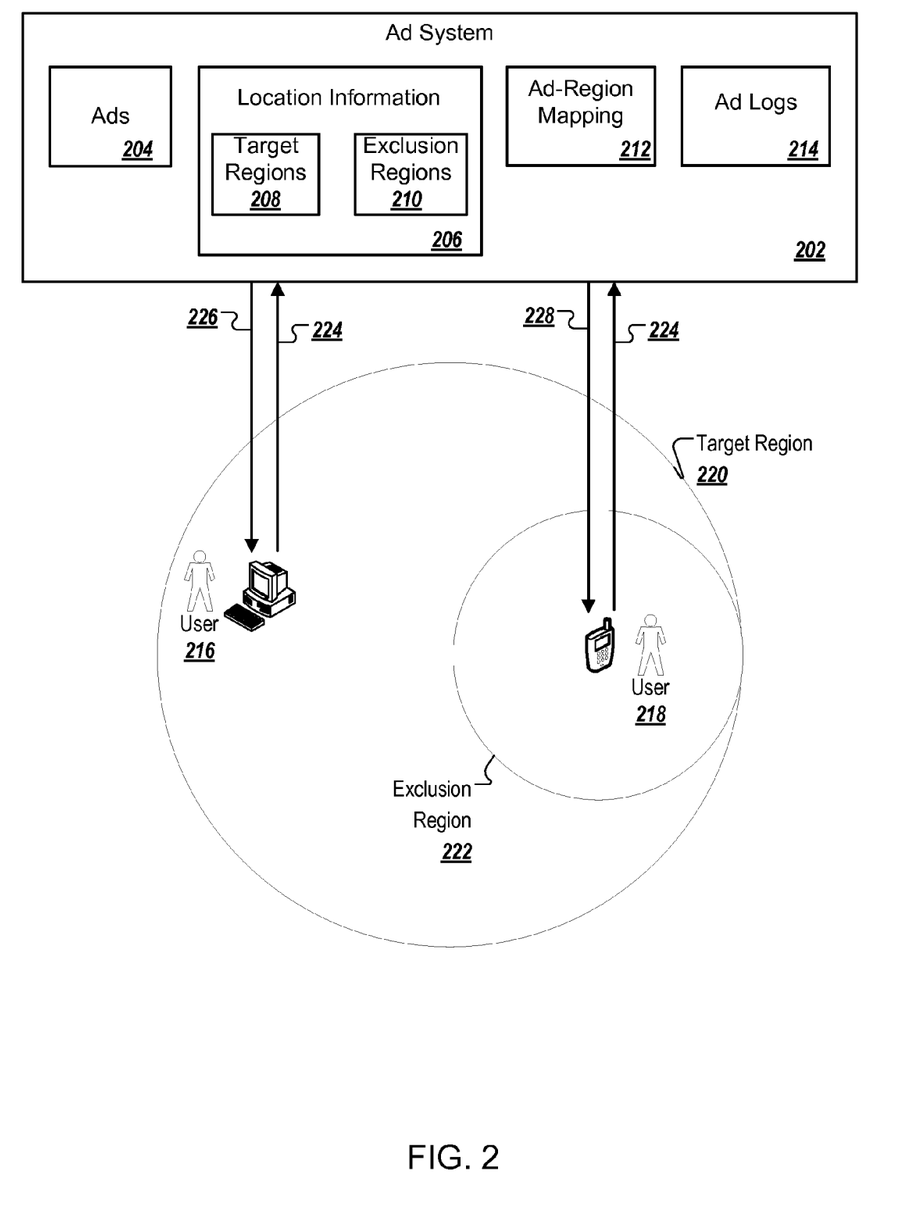
FIG. 2 is a block diagram of an example advertising system for regional location-based advertising.

FIG. 2 is a block diagram of an example advertising system 202 for regional location-based advertising. The ad system 202 includes an ad repository 204, location information 206 for target regions 208 and exclusion regions 210, ad-region mapping 212, and ad logs 214. Users 216 and 218 can interact with the ad system 202 to receive ads 226 and to provide location information 224 to the advertising system 202.

The ad system 202 can select one or more ads from the ad repository 204 and send the selected ads to users 216 and 218. Typically, the ad system 202 selects different ads to send to users 216 and 218 depending on where the users 216 and 218 are located.

The ad system 202 identifies at least one target region 220 and an exclusion region 222 of the target region 220, where the target region 220 encompasses the exclusion region 222. In some implementations, identifying the target region 220 and the exclusion region 222 includes receiving location information 206, for example, from an advertiser.

The target region information 208 and the exclusion region information 210 can be specified using various techniques. For example, the target region information 208 or the exclusion region information 210 can include one or more of: a geographic name (e.g., "New York City"), a zip code, a telephone area code, a shape corresponding to a region on a map (e.g., a circle or a square drawn by a person over an electronic map), and so on. As another example, a target region and/or an exclusion region can be a semantic location or a region surrounding a semantic location. A semantic location can be, for example, a shopping mall, a park, a landmark, or some other area of interest.

In some implementations, location information includes an identifier for a physical store. An advertiser specifies the identifier and the ad system 202 determines the location of the physical store using the identifier. Some example identifiers include, "store 51," "the Menlo Park store," "Noe Valley branch," and "ABC corp. home store." The ad system 202 determines the location of the physical store and defines a region (typically, an exclusion region) for the store. This is useful, for example, when an advertiser is targeting users in San Francisco with a target ad, but does not want those users to receive the target ad when they are in a store associated with the advertiser. The advertiser only has to provide a store identifier to define the exclusion region.

Ad-region mapping 212 associates ads with regions. For example, an ad from the ad repository 204 for agricultural equipment can be associated with a target region of the state of Illinois. Ad-region mapping 212 also associates ads with exclusion regions of target regions. For example, an ad for agricultural equipment (associated with a target region of the state of Illinois) can also be associated with an exclusion region of the city of Chicago.

The ad logs 214 identify ads presented to users and users' locations. The ad logs can include the ad, a timestamp for the ad delivery, one or more identifiers for the user (e.g., one or more deviceIDs, user IDs, or the like), and so on.

The ad system 202 identifies locations associated with users 216 and 218. In some implementations, the ad system 202 receives explicit location information 224, for example, global positioning system (GPS) coordinates from users (e.g., a user's mobile device), information from an indoor communication system (e.g., WiFi), information from an indoor positioning system (e.g., based on ultrasound or Bluetooth), or the like. In some other implementations, the ad system 202 determines a location associated with users based on other available information, for example, using an internet protocol (IP) address, location coordinates from a router for a wireless local area network (LAN), one or more search queries (e.g., as from a search service, not shown), or the like.

Based on users' identified locations, the ad system 202 determines whether the users are in a target region 220 (e.g., user 216) or an exclusion region encompassed by the target region 222 (e.g., user 218). The ad system 202 can use various techniques to determine that a user is in a certain region given that the user's location is only known approximately. For example, in some implementations, the system identifies the inaccuracy of the user location source and determines whether the user's actual location is likely within a region. In another example, where the accuracy of the user's location is unknown, the ad system 202 can use various heuristics to choose or estimate the accuracy of the source.

In some implementations, the ad system 202 sends target ads (e.g., ad 226) to users (e.g., user 216) in the target region 220, or boosts scores for target ads to increase the number of target ads sent to users in the target region 220. In some implementations, the ad system 202 withholds target ads from users in the exclusion region 222, or decreases scores for target ads to decrease the number of target ads sent to users in the exclusion region 222.

In some other implementations, the ad system 202 sends alternative ads (e.g., ad 228) (or boosts scores for alternative ads) to users in the exclusion region 222. Typically, in those other implementations, a single advertiser provides both a target ad (for display or boosting in the target region, except for in exclusion regions of the target region) and an alternative ad to be shown (or boosted) instead of the target ad to users in an exclusion region encompassed by the target region. For example, a store owner can provide a target ad intended to drive customers into his store, and provide an alternative ad intended to encourage customers to make purchases once they are inside the store. The store owner can associate the target ad with a target region of a mall, and he can associate the alternative ad with an exclusion region of his store. Alternatively, an advertiser can provide only a target ad and associate it with an exclusion region, allowing ad system 202 to select an alternative ad from another advertiser for the exclusion region.

Figure 3:
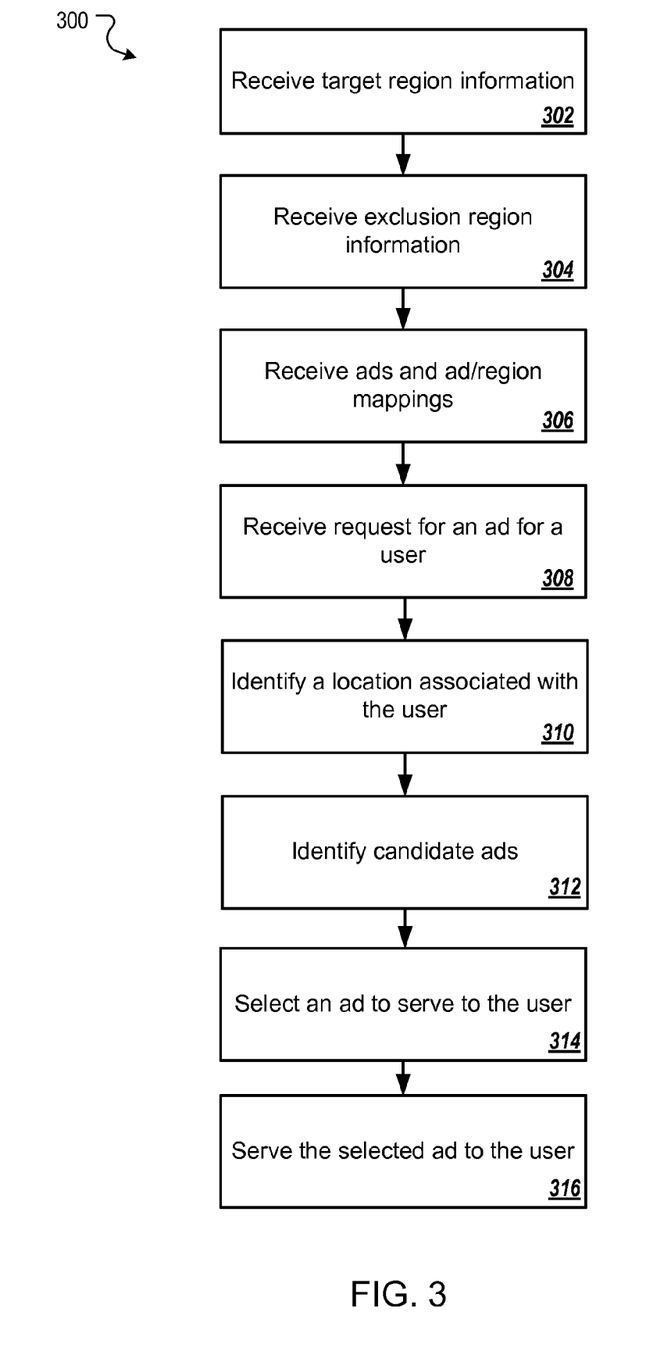
FIG. 3 is a flow diagram of an example process for regional location-based advertising.

FIG. 3 is a flow diagram of an example process 300 for regional location-based advertising. In some implementations, the process 300 is performed by a system (e.g., advertising management system 104 or ad system 202).

Target region information is received (step 302). Typically, the target region information is received from one or more advertisers (e.g., advertisers 102). Alternatively, the target region information is received from one or more publishers (e.g., publishers 106) or other entities.

Exclusion region information is received (step 304). Typically, the exclusion region information is received from one or more advertisers (e.g., advertisers 102). Alternatively, the exclusion region information is received from one or more publishers (e.g., publishers 106) or other entities.

In general, target region information is associated with a particular advertiser or publisher who submitted the target region. Similarly, exclusion region information is typically associated with the particular advertiser or publisher who submitted the exclusion region. Thus, for an advertiser or publisher who has submitted a target region and an exclusion region, the target region and the exclusion region define a pairing of regions associated with that advertiser or publisher.

The target region information and exclusion region information can be specified in various ways. For example, target region information or exclusion region information can include one or more of: a geographic name, a zip code, a telephone area code, or a shape corresponding to a region on a map. In some implementations, additional steps are taken to identify the target region and the exclusion region using the target region information and the exclusion region information. For example, a geographic name can be used to identify a set of latitude and longitude coordinates bounding a region.

In some implementations, the target region information is compared with the exclusion region information and a determination is made as to whether the target region specified by the target region information encompasses the exclusion region specified by the exclusion region information. If the target region does not encompass the exclusion region, the target region information or exclusion region information can be rejected, or an alert can be sent (e.g., to an advertiser that provided the information), or other actions can be taken.

In some implementations, information for one or more additional exclusion regions of the target region is received, where the target region encompasses the additional exclusion regions. In some implementations, the information defining the additional exclusion regions can be based whether users fall into a certain demographic, whether they have exhibited a particular online behavior, and so on. The information can be further based on geographical location.

Ads and ad/region mapping information is received (step 306). Target ads and information associating those target ads with target regions are received. In some cases, information associating target ads with exclusion regions is received. In some implementations, alternative ads and information associating those alternative ads with exclusion regions are received. For example, an advertiser can provide a target ad for users in a target region and not an exclusion region, and the same advertiser can provide an alternative ad to be shown instead of the target ad to users in the exclusion region.

In some implementations, a determination is made as to whether a predicted rate of advertisements sent to users in the target region exceeds or is less than a threshold rate. For example, a prediction can be made for a rate of ad impressions or conversions (e.g., monthly or weekly) for the target advertisement (for instance, using historical data on ad delivery, or an ads log 214). If the predicted rate is below a threshold rate, a recommendation can be sent (e.g., to an advertiser 102) to reduce the size of the exclusion region (in an effort to increase the rate). If the predicted rate is above a threshold rate, a recommendation can be sent to increase the size of the exclusion region.

In some implementations, a user interface is presented (e.g., to an advertiser 102) showing a recommendation for changing the size of a region (a target region or an exclusion region). The advertiser or publisher specifying the region can consider whether or not to accept the recommendation using the user interface. For example, the advertiser or publisher can weigh its original goal of having an exclusion region against the predicted rate of advertisements using the recommended region.

Specified threshold rates or received threshold rates can be used with the location information (e.g., from an advertiser 102). In some implementations, a determination is made as to whether a predicted rate of advertisements sent to users in the exclusion region exceeds or is less than a threshold rate.

In some implementations, the a determination is made as to whether the precision of location signals in a region will be sufficient to distinguish whether users are in the target region or are in an exclusion region of the target region. For example, if the target region is a mall and certain stores are exclusion regions, department stores can be large enough to distinguish users while boutique stores can be clustered too closely to reliably determine which store a user is in.

A request for an ad for a user is received (step 308). For example, a request from a publisher (e.g., publisher 106) can be received.

A location associated with the user is identified (step 310). In some implementations, explicit location information is received, for example, global positioning system (GPS) coordinates from the user (e.g., the user's mobile device), information from an indoor communication system (e.g., WiFi), information from an indoor positioning system (e.g., based on ultrasound or Bluetooth), or the like. In some other implementations, a location associated with the user is determined based on other available information, for example, using an internet protocol (IP) address, location coordinates from a router for a wireless local area network (LAN), one or more search queries (e.g., from a search service), or the like.

Candidate ads are identified (step 312). The ads can be, for example, from an ad repository 204. An ad is selected from the candidate ads to serve to the user, based on the user's location (step 314). Selecting the ad is described in more detail below with respect to FIGS. 4A and 4B.

The selected ad is served to the user (step 316). In some implementations, the selected ads are provided directly to the user's device (e.g., for incorporation into content presented on the device). For example, a user's mobile browser can integrate the ads into presented web content, search results, etc. Alternatively, mobile applications can incorporate received ads into the displayed application content. In some other implementations, the ads are sent to a publisher (e.g., publisher 106 or a search system) for incorporation into content prior to sending the content to the user.

Figure 4A:
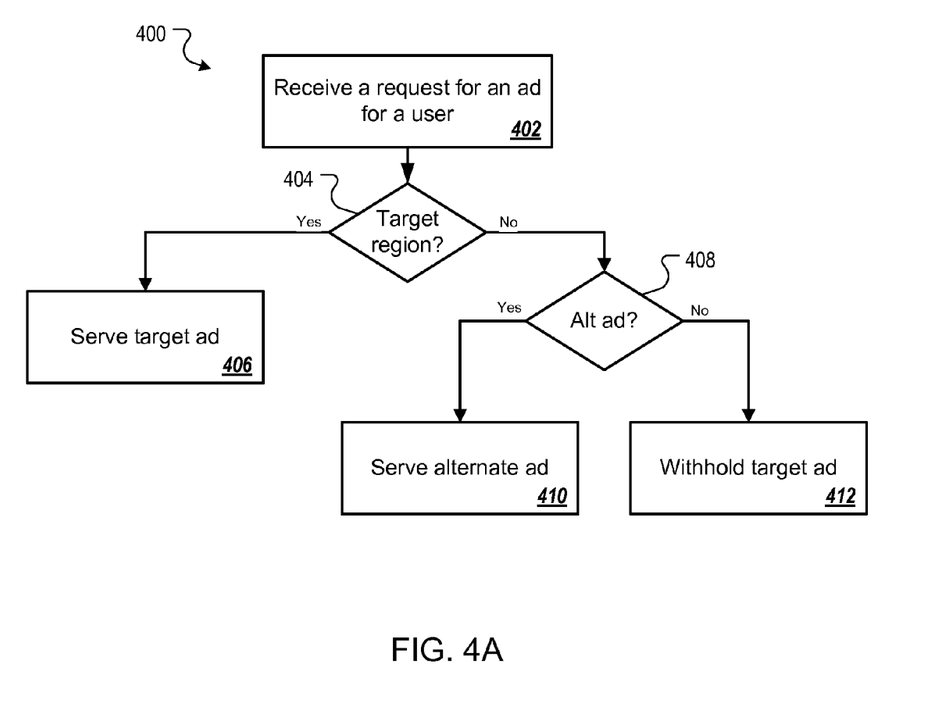
FIG. 4A is a flow diagram of an example process for selecting an advertisement based on a user's location.

FIG. 4A is a flow diagram of an example process 400 for selecting an advertisement based on a user's location. In some implementations, the process 400 is performed by a system (e.g., advertising management system 104 or ad system 202).

A request is received to serve an ad to a user, for example, from a publisher (e.g., publisher 106), a search system, directly from the user, etc. (step 402). A location associated with the user is identified. A determination is made as to whether the user is in a target region or an exclusion region of a target region (step 404).

If the user is within a target region and not an exclusion region of that target region, a target ad associated with that region is served to the user (step 406). If the user is within an exclusion region of a target region, a determination is made as to whether an alternative ad is associated with the exclusion region (step 408). If an alternative ad is associated, the user is served the alternative ad (step 410). If no alternative ad is associated, the target ad is withheld (step 412). In some implementations, another ad is served.

Figure 4B:
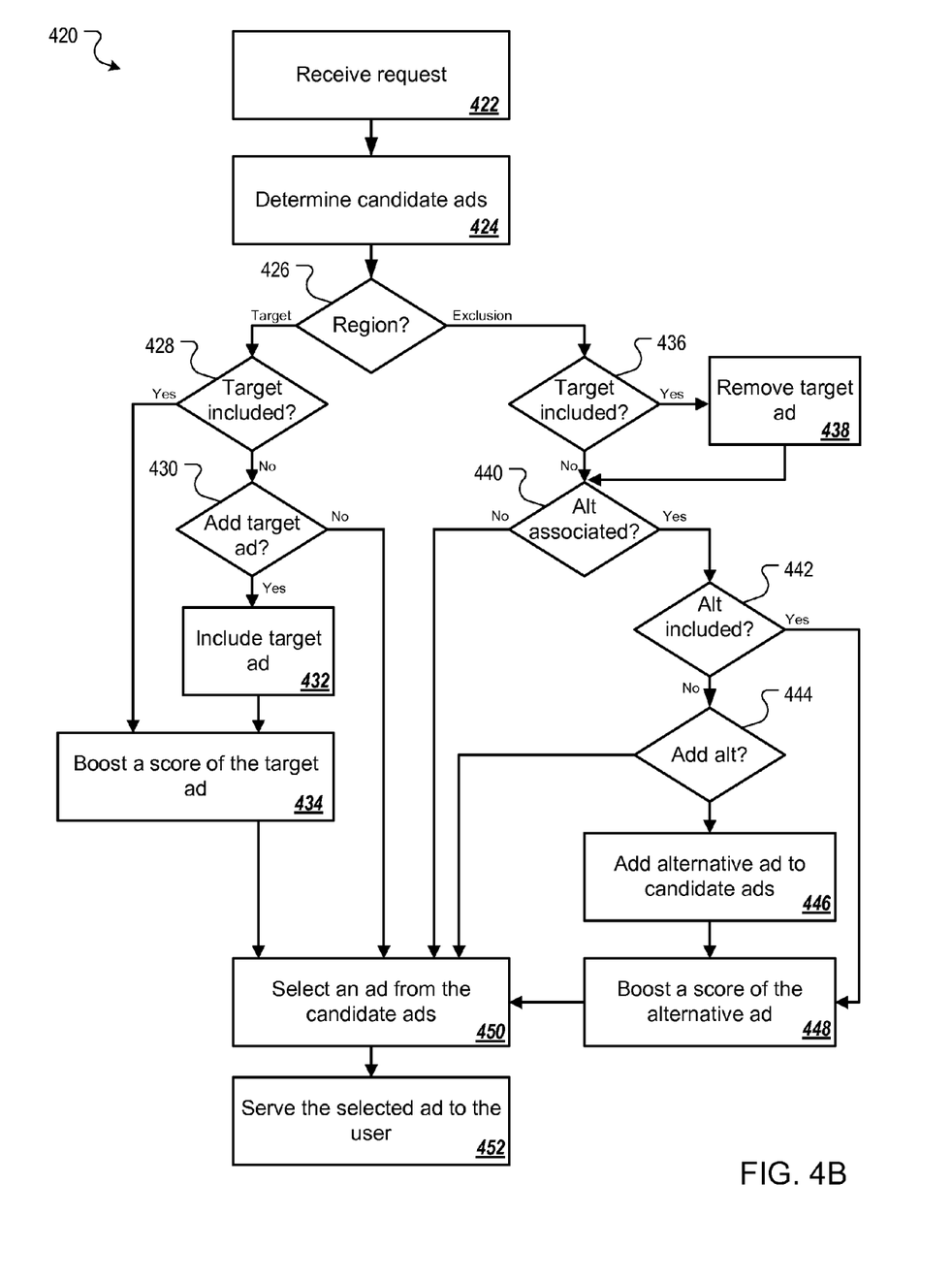
FIG. 4B is a flow diagram of an example process for selecting an advertisement based on a user's location.

FIG. 4B is a flow diagram of an example process 420 for selecting an advertisement based on a user's location. In some implementations, the process 420 is performed by a system (e.g., advertising management system 104 or ad system 202).

A request to serve an ad to a user is received, for example, from a publisher (e.g., publisher 106), a search system, directly from the user, etc. (step 422). One or more candidate ads are determined (step 424). Candidate ads can be determined using various techniques. For example, the candidate ads can be selected from an ad repository 204 based on a context provided from a publisher (for instance, the context can be sports, music, finance, or the like). In another example, candidate ads can be selected based on the user's browsing history, or keywords of a search query entered by the user.

A location associated with the user is identified, and whether the user is in a target region or an exclusion region of the target region is determined (step 426). If the user is in the target region and not an exclusion region of the target region, steps 428-434 are performed. If the user is in the exclusion region of the target region, steps 442-448 are performed.

If the user is in the target region and not an exclusion region of the target region, a determination is made as to whether a target ad associated with the target region is already included in the candidate ads (step 428). In some implementations, if the target ad is not already included, a determination is made as to whether to add it to the candidate ads (step 430). For example, whether the context of the target ad matches a context provided with the ad request can be determined. In some other implementations, the target ad is added to the candidate ads without any further determinations. If it is determined to add the target ad to the candidate ads, the target ad is added (step 432).

A score of the target ad is optionally boosted (step 434). In some implementations, each candidate ad has an associated score that will be used during ad selection. For example, each score could be based on how closely each candidate ad matches a requested context, or how much an advertiser has paid for each ad, or the like. In some implementations, the target ad is only boosted if an advertiser has paid an extra fee. The amount of boosting can be based on, for example, the amount of the extra fee.

If the user is in the exclusion region of the target region, an optional determination is made as to whether the target ad is included in the candidate ads (step 436). If the target ad is included in the candidate ads, the target ad can be restricted (e.g., removed from the candidate ads, or have an associated score be decreased) (step 438).

Whether an alternative ad is associated with the exclusion region is determined (step 440). If an alternative ad is associated, whether it is already included as a candidate ad is determined (step 442). If the alternative ad is not a candidate ad, whether to add the alternative ad is optionally determined (step 444). For example, a determination can be made as to whether the context of the alternative ad matches a context provided with the ad request. In some other implementations, the alternative ad is not added if it is not already included with the candidate ads. If it is determined to add the alternative ad to the candidate ads, the alternative ad is added (step 446). A score of the alternative ad can be optionally boosted (step 448).

An ad is selected from the candidate ads (step 450). In some implementations, the candidate ad having the highest score is selected. The ad is served to the user (step 452).

Thus, FIGS. 4A and 4B show ad selection based on whether a user is in a target region or an exclusion region of a target region. Ad selection can also be based on other factors, for example, the user's device type, or a type of application running on the user's device.

In some implementations, ads are targeted to users using certain devices within a target region or exclusion region. For example, consider an advertiser of a type of mobile devices, where the mobile devices are sold in stores. Ads for the mobile devices can be targeted to users, who are not already using that type of mobile device, within a target region including the stores. Ads for upgrades of the mobile devices can be targeted to users, who are using that type of mobile device, and are within the target region. Ads for that type of mobile device can be withheld from users who are actually inside the stores (in exclusion regions).

In some implementations, ads are targeted to users based on whether the users are using a certain type of application on a mobile device. For example, consider an advertiser for video games (e.g., a video game company). Ads for games can be targeted to users in target regions who are using a video game application (e.g., where the video game application requests the ad), and withheld from users in exclusion regions or who are not using a video game application.

Figure 5:
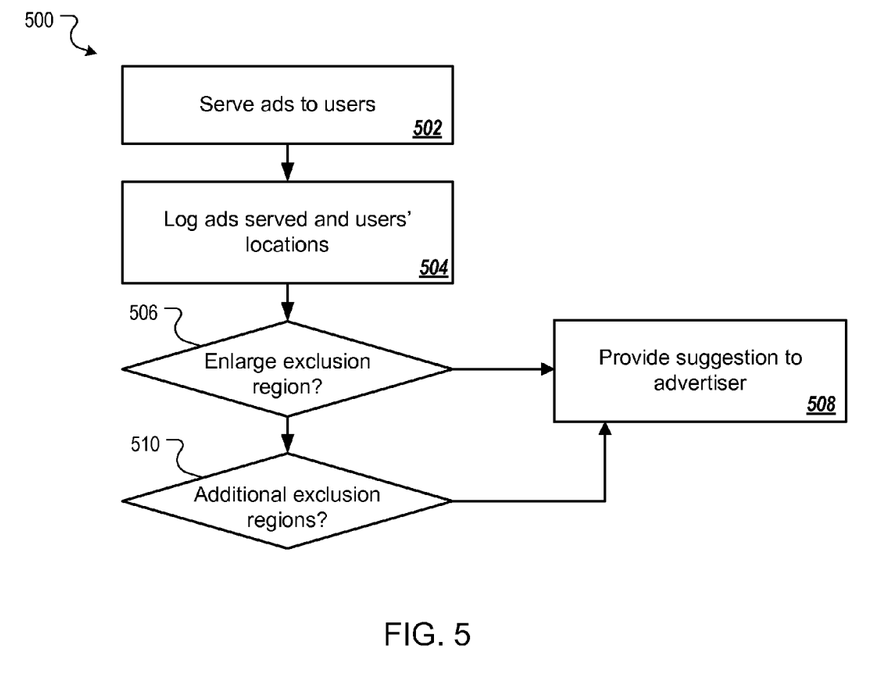
FIG. 5 is a flow diagram of an example process for generating suggestions to change target and exclusion regions.

FIG. 5 is a flow diagram of an example process 500 for generating suggestions to change target and exclusion regions. In some implementations, the process 500 is performed by a system (e.g., advertising management system 104 or ad system 202).

Ads are served to users (step 502). Typically, a target ad is served (exclusively or with greater frequency) to users in a target region and not in any exclusion regions of the target region, and an alternative ad is served (exclusively or with greater frequency) to users in an exclusion region of the target region. In some cases, no alternative ad is associated with the exclusion region.

Ads served and users' locations when those ads are served are logged (step 504). In some implementations, users' locations are logged anonymously. In some other implementations, information is stored to identify each user.

The ads presented to the users can be logged in an ads log (e.g., ads log 214). Information logged in the ad logs can include, for example, for each logged advertisement, an advertisement identifier (e.g., advertisement title, advertisement number), a creative or advertising group identifier, an advertisement campaign identifier, a device identifier of a mobile device to which the advertisement was presented, a timestamp indicating when the advertisement was presented on the mobile device, an indicator of whether the user was within a target region or an exclusion region of a target region, and so on.

A device identifier can be, for example, a unique alphanumeric identifier associated with the mobile device (or an identifier derived from the device identifier to protect user privacy), or can be a username (or other user identifier) of the user of the mobile device. A device identifier stored in the ads log can be obfuscated for privacy reasons. For example, a stored identifier can be a random identifier derived from an actual device identifier, or a stored identifier can be an encrypted version of a device identifier.

A determination is made as to whether the exclusion region should be enlarged (step 506). For example, a prediction can be determined for an advertising metric (e.g., click through rate, offline conversion rate, or the like) based on an enlarged exclusion region. If the prediction exceeds the current or historical metric, it can be determined that the exclusion region should be enlarged. In some implementations, predicted metrics can be periodically compared with current or historical metrics to determine whether the exclusion region should be enlarged.

In some implementations, advertisers and publishers can specify assumptions (e.g., regarding advertising performance metrics) when they define target and exclusion regions. In those implementations, those assumptions are compared against measured data periodically (e.g., after a certain period of time, or after a certain number of ads are served). The comparison is presented to the advertisers and publishers (e.g., with a user interface in a web page) so they can remember and re-evaluation those assumptions.

If it is determined that the exclusion region should be enlarged, a suggestion is provided to an advertiser (or other entity, e.g., whatever entity provided the previous size of the exclusion region) (step 508). For example, location information can be sent for an enlarged exclusion region used to make a prediction for an advertising metric.

A determination is made as to whether additional exclusion regions should be added within the target region (step 508). For example, a prediction for an advertising metric can be determined based on an additional exclusion region. If the prediction exceeds the current or historical metric, it is determined that the additional exclusion region should be added. If it is determined that additional exclusion regions should be added within the target region, a suggestion is provided to an advertiser (or other entity, e.g., whatever entity provided the previous size of the exclusion region) (step 508).

Similarly, in some implementations, a determination can be made as to whether the size or shape of the target region should be changed. A suggestion can be provided to an advertiser to change the target region.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on a computer storage media for execution by, or to control the operation of, data processing apparatus. The computer storage medium can be, or be included in, a computer-readable storage device, a computer-readable storage substrate, a random or serial access memory array or device, or a combination of one or more of them.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described is this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any implementation or of what may be claimed, but rather as descriptions of features that may be specific to particular embodiments of particular implementations. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A method performed by one or more processors, the method comprising:
   identifying, by the one or more processors, a target region and an exclusion region of the target region, where the target region encompasses the exclusion region and the target region is a geographic region;
   receiving one or more target advertisements from an advertiser, the advertiser specifying that the one or more target advertisements should be preferentially shown in the target region and not shown or preferred over one or more other advertisements in the exclusion region, where the one or more target advertisements are intended by the advertiser to drive users within the target region into the exclusion region;
   receiving one or more exclusion advertisements from the advertiser, the advertiser specifying that the one or more exclusion advertisements should be shown instead of the one or more target advertisements in the exclusion region, where the one or more exclusion advertisements are intended by the advertiser to encourage users within the exclusion region to make specific transactions with the advertiser or entities associated with the advertiser;
identifying, by the one or more processors, a target user within the target region and not within the exclusion region encompassed by the target region;
selecting, by the one or more processors, a target advertisement of the one or more target advertisements for the target user based on the target user being within the target region and not within the exclusion region encompassed by the target region;
sending the target advertisement to a device of the target user;
identifying, by the one or more processors, an exclusion user within the exclusion region encompassed by the target region;
selecting, by the one or more processors, an exclusion advertisement of the one or more exclusion advertisement different from the target advertisement for the exclusion user based on the exclusion user being with the exclusion region; and
sending the exclusion advertisement to a device of the exclusion user.

2. The method of claim 1, where identifying the exclusion region includes receiving an identifier of a physical store from the advertiser and determining the location of the physical store.

3. The method of claim 1, where identifying the target region and the exclusion region encompassed by the target region includes receiving target region information and exclusion region information from the advertiser.

4. The method of claim 3, where the target region information or exclusion region information includes one or more of: a geographic name, a zip code, a telephone area code, or a shape corresponding to a region on a map.

5. The method of claim 3, further comprising:
comparing the target region information with the exclusion region information; and
determining whether the target region specified by the target region information encompasses the exclusion region specified by the exclusion region information.

6. The method of claim 1, where identifying the target user or the exclusion user includes receiving one or more of: global positioning system (GPS) coordinates from a mobile device, location coordinates from a router for a wireless local area network (LAN), an internet protocol (IP) address, or one or more search queries.

7. The method of claim 1 further comprising:
identifying an additional exclusion region encompassed by the target region;
identifying an additional exclusion user within the additional exclusion region encompassed by the target region; and
sending an additional exclusion advertisement to the additional exclusion user.

8. The method of claim 7, where identifying the additional exclusion region includes receiving additional exclusion region information from the advertiser, and where the additional exclusion region information includes one or more of: a demographic specification or an online behavior specification.

9. A method performed by one or more processors, the method comprising:
identifying, by the one or more processors, a target region and an exclusion region of the target region, where the target region encompasses the exclusion region and the target region is a geographic region;
identifying, by the one or more processors, a target user within the target region and not within the exclusion region encompassed by the target region;
selecting, by the one or more processors, a target advertisement for the target user based on the target user being within the target region and not within the exclusion region encompassed by the target region;
sending the target advertisement to a device of the target user;
identifying, by the one or more processors, an exclusion user within the exclusion region encompassed by the target region;
selecting, by the one or more processors, an exclusion advertisement different from the target advertisement for the exclusion user based on the exclusion user being with the exclusion region;
sending the exclusion advertisement to a device of the exclusion user; and
providing a suggestion to an advertiser to change the size of the exclusion region of the target region or to introduce additional exclusion regions.

10. A method performed by one or more processors, the method comprising:
receiving a request to serve a content item to a user;
determining, by the one or more processors, one or more candidate content items;
identifying a location associated with the user;
determining, by the one or more processors, whether any of the candidate content items are associated with a target region including the location of the user;
determining, by the one or more processors, whether any of the candidate content items are associated with an exclusion region including the location of the user, where the target region encompasses the exclusion region and the target region is a geographic region, where the target region and the exclusion region define a pairing of regions associated with an advertiser, where one or more target advertisements are received from the advertiser, specified by the advertiser to be preferentially shown in the target region and not shown or preferred over one or more other advertisements in the exclusion region, and intended by the advertiser to entice users within the target region to move into the exclusion region, and where one or more exclusion advertisements are received from the advertiser, specified by the advertiser to be shown in the exclusion region, and intended by the advertiser to encourage users within the exclusion region to make one or more specific transactions with the advertiser or an entity associated with the advertiser;
boosting, by the one or more processors, a score of each candidate content item determined to be associated with the target region and not associated with the exclusion region encompassed by the target region;
restricting, by the one or more processors, candidate content items determined to be associated with the exclusion region;
selecting, by the one or more processors, a content item of the one or more candidate content items to serve to the user using the scores for the candidate content items; and
serving the selected content item to a device of the user.

11. The method of claim 10, where restricting candidate content items includes removing them as candidates.

12. The method of claim 10, where restricting candidate content items includes decreasing a score of each candidate content item associated with the exclusion region.

13. The method of claim 10, where restricting candidate content items includes substituting an alternative candidate content item for one of the one or more candidate content items.

14. The method of claim 10, further comprising:
determining whether any of the candidate content items are associated with one or more additional exclusion regions including the location of the user, where the target region encompasses each additional exclusion region; and
restricting candidate content items determined to be associated with one of the one or more additional exclusion regions.

15. A system comprising one or more computers configured to perform operations comprising:
identifying a target region and an exclusion region of the target region, where the target region encompasses the exclusion region and the target region is a geographic region;
receiving one or more target advertisements from an advertiser, the advertiser specifying that the one or more target advertisements should be preferentially shown in the target region and not shown or preferred over one or more other advertisements in the exclusion region, where the one or more target advertisements are intended by the advertiser to drive users within the target region into the exclusion region;
receiving one or more exclusion advertisements from the advertiser, the advertiser specifying that the one or more exclusion advertisements should be shown instead of the one or more target advertisements in the exclusion region, where the one or more exclusion advertisements are intended by the advertiser to encourage users within the exclusion region to make specific transactions with the advertiser or entities associated with the advertiser;
identifying a target user within the target region and not within the exclusion region encompassed by the target region;
selecting a target advertisement of the one or more target advertisements for the target user based on the target user being within the target region and not within the exclusion region encompassed by the target region;
sending the target advertisement to a device of the target user;
identifying an exclusion user within the exclusion region encompassed by the target region;
selecting an exclusion advertisement of the one or more exclusion advertisement different from the target advertisement for the exclusion user based on the exclusion user being with the exclusion region; and
sending the exclusion advertisement to a device of the exclusion user.

16. The system of claim 15, where identifying the exclusion region includes receiving an identifier of a physical store from the advertiser and determining the location of the physical store.

17. The system of claim 15, where identifying the target region and the exclusion region encompassed by the target region includes receiving target region information and exclusion region information from the advertiser.

18. The system of claim 17, where the target region information or exclusion region information includes one or more of: a geographic name, a zip code, a telephone area code, or a shape corresponding to a region on a map.

19. The system of claim 17, the operations further comprising:
comparing the target region information with the exclusion region information; and
determining whether the target region specified by the target region information encompasses the exclusion region specified by the exclusion region information.

20. The system of claim 15, where identifying the target user or the exclusion user includes receiving one or more of: global positioning system (GPS) coordinates from a mobile device, location coordinates from a router for a wireless local area network (LAN), an internet protocol (IP) address, or one or more search queries.

21. The system of claim 15, the operations further comprising:
identifying an additional exclusion region encompassed by the target region;
identifying an additional exclusion user within the additional exclusion region encompassed by the target region; and
sending an additional exclusion advertisement to the additional exclusion user.

22. The system of claim 21 where identifying the additional exclusion region includes receiving additional exclusion region information from the advertiser, and where the additional exclusion region information includes one or more of: a demographic specification or an online behavior specification.

23. A system comprising one or more computers configured to perform operations comprising:
identifying a target region and an exclusion region of the target region, where the target region encompasses the exclusion region;
identifying a target user within the target region and not within the exclusion region encompassed by the target region;
selecting a target advertisement for the target user based on the target user being within the target region and not within the exclusion region encompassed by the target region;
sending the target advertisement to the target user;
identifying an exclusion user within the exclusion region encompassed by the target region;
selecting an exclusion advertisement different from the target advertisement for the exclusion user based on the exclusion user being with the exclusion region;
sending the exclusion advertisement to the exclusion user; and
providing a suggestion to an advertiser to change the size of the exclusion region of the target region or to introduce additional exclusion regions.

24. A system comprising one or more computers configured to perform operations comprising:
receiving a request to serve a content item to a user;
determining one or more candidate content items;
identifying a location associated with the user;
determining whether any of the candidate content items are associated with a target region including the location of the user;
determining whether any of the candidate content items are associated with an exclusion region including the location of the user, where the target region encompasses the exclusion region and the target region is a geographic region, where the target region and the exclusion region define a pairing of regions associated with an advertiser, where one or more target advertisements are received from the advertiser, specified by the advertiser to be preferentially shown in the target region and not shown or preferred over one or more other advertisements in the exclusion region, and intended by the advertiser to entice users within the target region to move into the exclusion region, and where one or more exclusion advertisements are received from the advertiser, specified by the advertiser to be shown in the exclusion region, and intended by the advertiser to encourage users within the exclusion region to make one or more specific transactions with the advertiser or an entity associated with the advertiser;

boosting a score of each candidate content item determined to be associated with the target region and not associated with the exclusion region encompassed by the target region;

restricting candidate content items determined to be associated with the exclusion region;

selecting a content item of the one or more candidate content items to serve to the user using the scores for the candidate content items; and serving the selected content item to a device of the user.

25. The system of claim 24, where restricting candidate content items includes removing them as candidates.

26. The system of claim 24, where restricting candidate content items includes decreasing a score of each candidate content item associated with the exclusion region.

27. The system of claim 24, where restricting candidate content items includes substituting an alternative candidate content item for one of the one or more candidate content items.

28. The system of claim 24, the operations further comprising:

determining whether any of the candidate content items are associated with one or more additional exclusion regions including the location of the user, where the target region encompasses each additional exclusion region; and restricting candidate content items determined to be associated with one of the one or more additional exclusion regions.

29. A non-transitory computer storage medium encoded with a computer program, the program comprising instructions that when executed by data processing apparatus cause the data processing apparatus to perform operations comprising:

identifying a target region and an exclusion region of the target region, where the target region encompasses the exclusion region and the target region is a geographic region;

receiving one or more target advertisements from an advertiser, the advertiser specifying that the one or more target advertisements should be preferentially shown in the target region and not shown or preferred over one or more other advertisements in the exclusion region, where the one or more target advertisements are intended by the advertiser to drive users within the target region into the exclusion region;

receiving one or more exclusion advertisements from the advertiser, the advertiser specifying that the one or more exclusion advertisements should be shown instead of the one or more target advertisements in the exclusion region, where the one or more exclusion advertisements are intended by the advertiser to encourage users within the exclusion region to make specific transactions with the advertiser or entities associated with the advertiser;

identifying a target user within the target region and not within the exclusion region encompassed by the target region;

selecting a target advertisement of the one or more target advertisements for the target user based on the target user being within the target region and not within the exclusion region encompassed by the target region;

sending the target advertisement to a device of the target user;

identifying an exclusion user within the exclusion region encompassed by the target region;

selecting an exclusion advertisement of the one or more exclusion advertisement different from the target advertisement for the exclusion user based on the exclusion user being with the exclusion region; and sending the exclusion advertisement to a device of the exclusion user.

30. A non-transitory computer storage medium encoded with a computer program, the program comprising instructions that when executed by data processing apparatus cause the data processing apparatus to perform operations comprising:

receiving a request to serve a content item to a user;

determining one or more candidate content items;

identifying a location associated with the user;

determining whether any of the candidate content items are associated with a target region including the location of the user;

determining whether any of the candidate content items are associated with an exclusion region including the location of the user, where the target region encompasses the exclusion region and the target region is a geographic region, where the target region and the exclusion region define a pairing of regions associated with an advertiser, where one or more target advertisements are received from the advertiser, specified by the advertiser to be preferentially shown in the target region and not shown or preferred over one or more other advertisements in the exclusion region, and intended by the advertiser to entice users within the target region to move into the exclusion region, and where one or more exclusion advertisements are received from the advertiser, specified by the advertiser to be shown in the exclusion region, and intended by the advertiser to encourage users within the exclusion region to make one or more specific transactions with the advertiser or an entity associated with the advertiser;

boosting a score of each candidate content item determined to be associated with the target region and not associated with the exclusion region encompassed by the target region;

restricting candidate content items determined to be associated with the exclusion region;

selecting a content item of the one or more candidate content items to serve to the user using the scores for the candidate content items; and serving the selected content item to a device of the user.

* * * * *